US009177288B2

(12) United States Patent
Merrifield

(10) Patent No.: US 9,177,288 B2
(45) Date of Patent: *Nov. 3, 2015

(54) SYSTEM AND METHOD FOR CUSTOMIZED EXPERIENCES IN A SHARED ONLINE ENVIRONMENT

(75) Inventor: Lane Merrifield, Kelowna (CA)

(73) Assignee: Disney Enterprises, Inc., Burbank, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/240,963

(22) Filed: Sep. 22, 2011

(65) Prior Publication Data

US 2012/0016937 A1 Jan. 19, 2012

Related U.S. Application Data

(63) Continuation of application No. 12/321,424, filed on Jan. 20, 2009, now Pat. No. 8,108,468.

(51) Int. Cl.
*G06F 15/16* (2006.01)
*H04L 12/58* (2006.01)
*H04L 29/08* (2006.01)
(Continued)

(52) U.S. Cl.
CPC .......... *G06Q 10/10* (2013.01); *G06F 17/30867* (2013.01); *G06Q 50/01* (2013.01); *H04L 12/588* (2013.01); *H04L 51/32* (2013.01); *H04L 67/306* (2013.01)

(58) Field of Classification Search
USPC ........................................................ 709/205
See application file for complete search history.

(56) References Cited

U.S. PATENT DOCUMENTS 7,840,903 B1* 11/2010 Amidon et al. ................ 715/757
8,037,416 B2* 10/2011 Bates et al. .................... 715/757
(Continued)

FOREIGN PATENT DOCUMENTS

JP           11-25288      1/1999
WO    WO 2008/024349   2/2008

OTHER PUBLICATIONS

Hiroyuki Hiura et al. "Digital Campus: Amenity Management and Experimental Environmental for Home Delivery of Lectures via Ipv6 Broadband internet", Proceedings of DBWeb2002 (Database an Web Information Systems Symposium), Information Processing Society of Japan, Dec. 3, 2002, No. 19 p. 113-120.
(Continued)

*Primary Examiner* — Angela Nguyen
(74) *Attorney, Agent, or Firm* — Farjami & Farjami LLP

(57) ABSTRACT

There is provided a system and method for providing customized experiences to a plurality of client stations in a shared environment. There is provided an accounts database having data relating to a plurality of clients, an online server having a server processor and hosting the shared environment for access by the plurality of client stations, and an online client application for execution by a client processor of a client station. The server processor is configured to retrieve client data from the accounts database relating to a client, determine client preferences of the client based on the client data, create a customized environment from the shared environment according to the client preferences, and send the customized environment to the online client application of a client station associated with the client for rendering the customized environment on a client display. User interactions may be filtered to maintain a shared environment perception.

6 Claims, 4 Drawing Sheets

(51) Int. Cl.
*G06Q 10/10* (2012.01)
*G06Q 50/00* (2012.01)
*G06F 17/30* (2006.01)

(56) References Cited

U.S. PATENT DOCUMENTS

| | | |
|---|---|---|
| 2002/0151366 A1 | 10/2002 | Walker |
| 2005/0272504 A1* | 12/2005 | Eguchi et al. ............ 463/40 |
| 2006/0080175 A1 | 4/2006 | Rowe |
| 2006/0089147 A1 | 4/2006 | Beaty |
| 2006/0121972 A1 | 6/2006 | Walker |
| 2006/0287069 A1 | 12/2006 | Walker |
| 2007/0032288 A1 | 2/2007 | Nelson |
| 2007/0155490 A1 | 7/2007 | Phillips |
| 2008/0017706 A1 | 1/2008 | Malik |
| 2008/0081701 A1* | 4/2008 | Shuster .................. 463/42 |
| 2008/0215994 A1* | 9/2008 | Harrison et al. ........ 715/757 |
| 2010/0037152 A1* | 2/2010 | Bates et al. ........... 715/757 |

OTHER PUBLICATIONS

Kiyoko Tanaka et al. " A Study on Grouping method for Multicast Delivery Service using Clustering Algorithms", Multimedia, Distributed, Cooperative and Mobile Symposium, Information Processing Society of Japan, Aug. 31, 2006, vol. 2004, No. 7, p. 289-292.

* cited by examiner

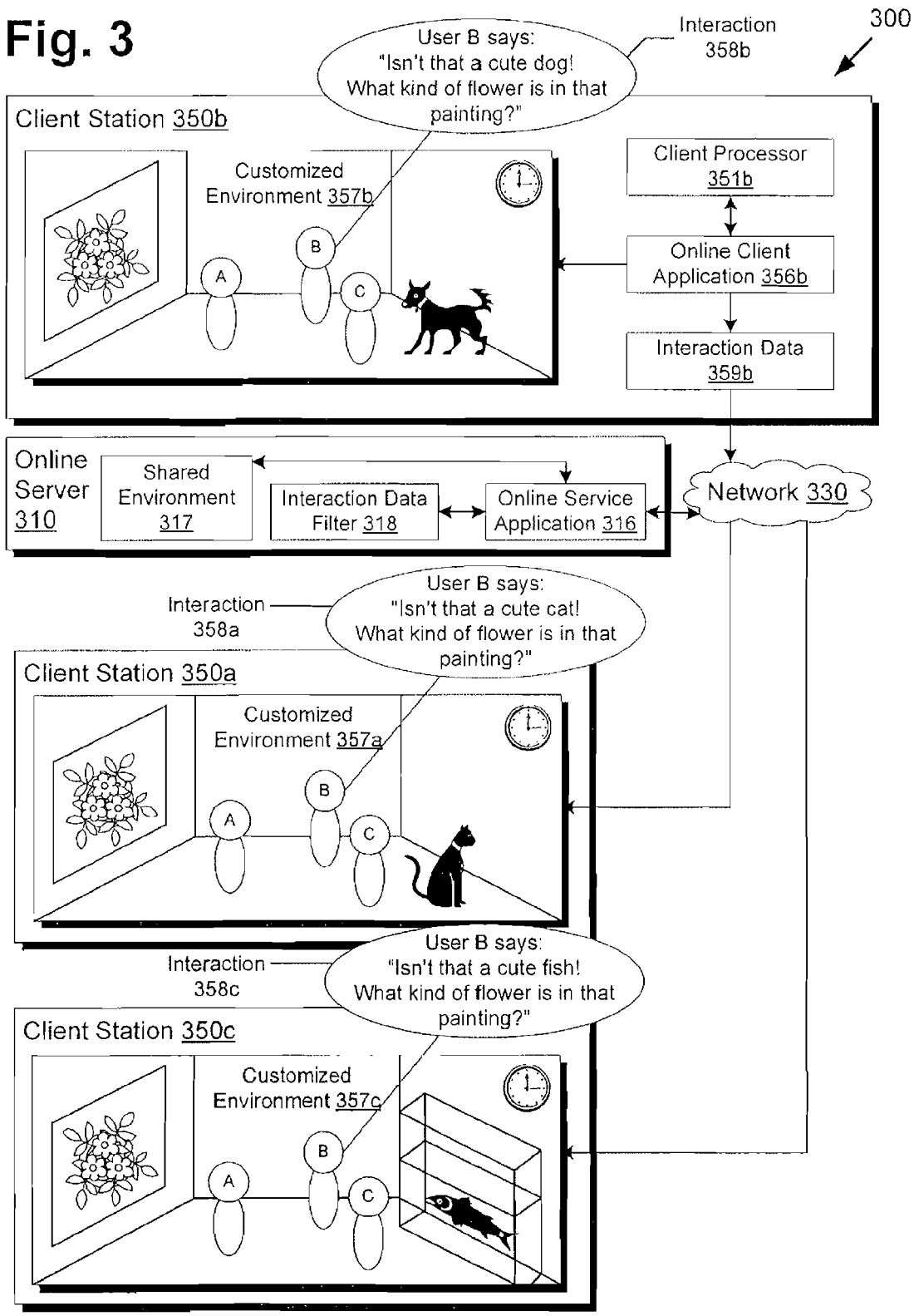

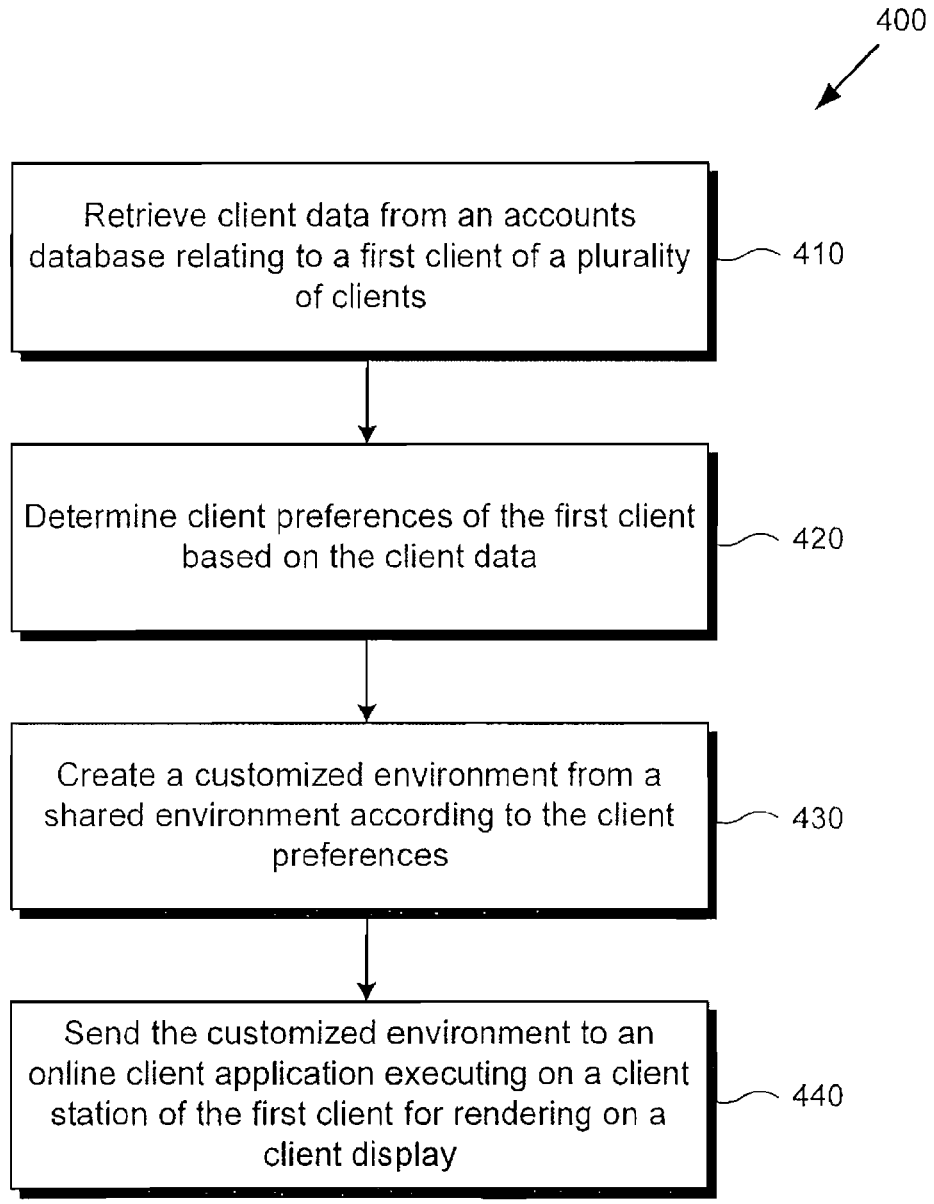

SYSTEM AND METHOD FOR CUSTOMIZED EXPERIENCES IN A SHARED ONLINE ENVIRONMENT

This application is a Continuation of U.S. patent application Ser. No. 12/321,424, now U.S. Pat. No. 8,108,468 filed on Jan. 20, 2009.

BACKGROUND OF THE INVENTION

1. Field of the Invention

The present invention relates generally to networking. More particularly, the present invention relates to methods of presenting online information.

2. Background Art

Networked applications present many advantages over traditional methods of presentation. For example, live lectures must generally be tailored to an anticipated lowest common denominator audience, often resulting in alienating large segments of the audience. Some may find the pace of the lecture languid, while others may find themselves hopelessly lost and discouraged. Similarly, a customer shopping in a large discount store might feel lost, overwhelmed, or apathetic, being presented with a huge inventory aimed for a broad audience rather than tailored to the particular interests of the customer. Traditional methods of presentation have typically treated audiences in the aggregate, marginalizing the unique needs of individuals.

On the other hand, networked applications can provide customized results tailored to particular interests or preferences of users, allowing highly relevant and compelling content delivery that engages users as individuals. By leveraging volunteered user information and tracking user behavior over a period of time, user preferences may be ascertained with increasing accuracy, encouraging user retention and repeat visits. Aggregate data concerning groups of users with common traits can also provide big picture trends, insights, and other data helpful for predicting the needs of users.

While networked applications can provide a very individualistic presentation as described above, networked applications can also bring diverse people together, providing group benefits by encouraging a sense of shared camaraderie and community. The explosion of socially focused applications on the Internet such as networking websites, friend groups, instant messaging chat, bulletin boards, online games, and many other social applications show that networked applications can foster all types of social online communities. Often, these shared social environments concern some common interest or hobby, allowing the formation of enthusiastic and focused groups for a wide range of topics.

One angle not commonly approached due to execution difficulties is the combination of customized individual personalization within a shared social environment. In shared social environments, group dynamics often exert predominant control, with less opportunity for individuals to have customized experiences tailored to their specific interests, as those specific interests may be irrelevant or contravene the group ethos. If an individual strays too far from common bonding elements of the shared social environment, the individual may end up voluntarily or forcibly parting ways with the group, sacrificing many social benefits. Thus, it has been difficult to reconcile customized individual personalization within a shared social environment due to the conflicting needs of groups and individuals.

Accordingly, there is a need to overcome the drawbacks and deficiencies in the art by providing a way to combine customized experiences within a shared online environment, allowing users to enjoy the benefits of group participation without sacrificing compelling individualized content.

SUMMARY OF THE INVENTION

There are provided systems and methods for providing customized experiences in a shared online environment, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 presents a block diagram of a network environment supporting filtering of client interactions to maintain a perception of a shared environment among client stations, according to one embodiment of the present invention; and FIG. 4 shows a flowchart describing the steps, according to one embodiment of the present invention, by which a server processor of an online server can provide customized experiences for client stations in a shared online environment.

DETAILED DESCRIPTION OF THE INVENTION

The present application is directed to a system and method for providing customized experiences in a shared online environment. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
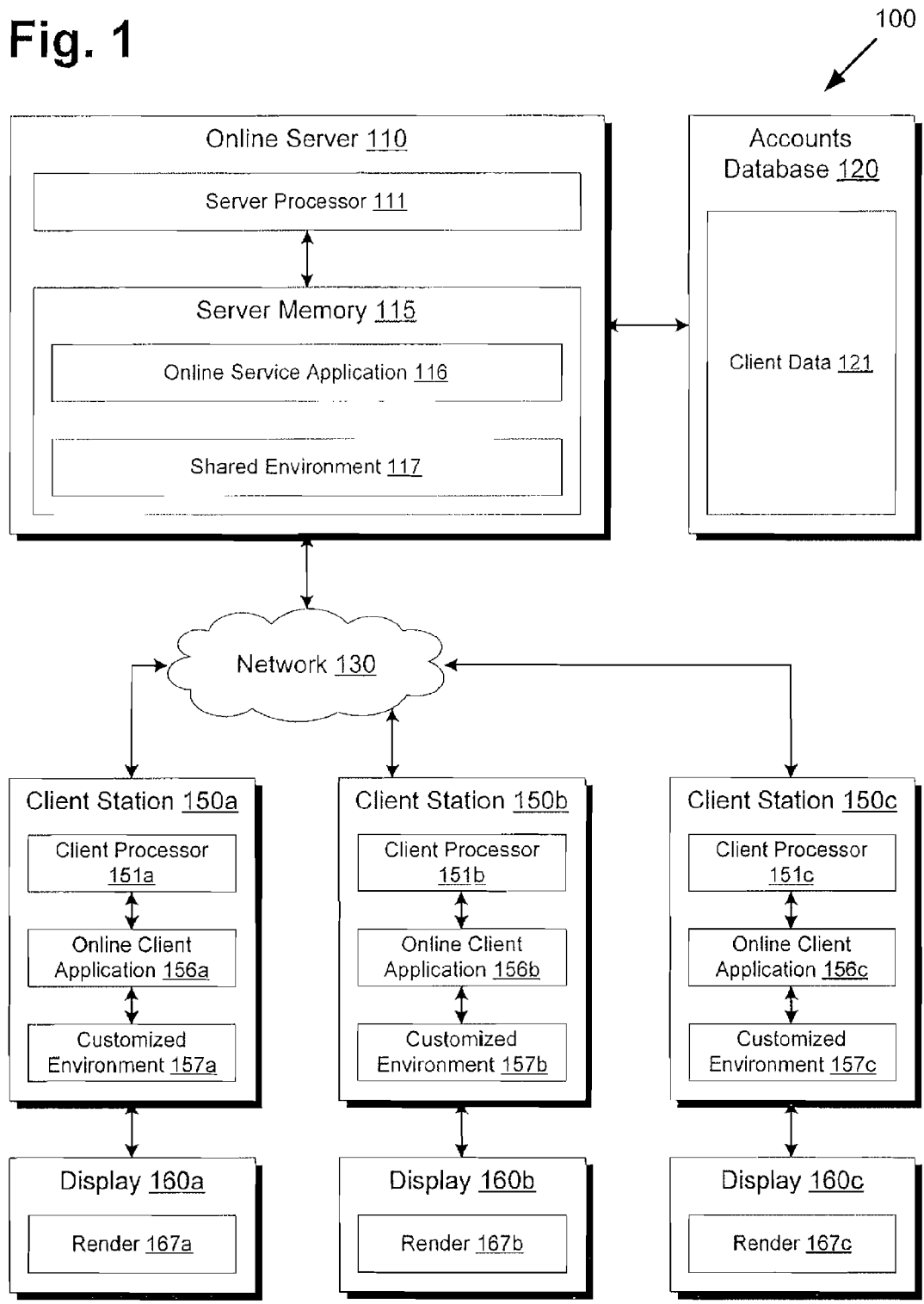
FIG. 1 presents a block diagram of a network environment supporting customized experiences in a shared online environment, according to one embodiment of the present invention.

FIG. 1 presents a block diagram of a network environment supporting customized experiences in a shared online environment, according to one embodiment of the present invention. Network environment 100 includes online server 110, accounts database 120, network 130, client station 150a, client station 150b, client station 150c, display 160a, display 160b, and display 160c. Online server 110 includes server processor 111 and server memory 115. Server memory 115 includes online service application 116 and shared environment 117. Accounts database 120 includes client data 121. Client station 150a includes client processor 151a, online client application 156a, and customized environment 157a. Client station 150b includes client processor 151b, online client application 156b, and customized environment 157b. Client station 150c includes client processor 151c, online client application 156c, and customized environment 157c.

Network environment 110 shows a high level diagram of online application 116 providing shared environment 117, such as a virtual world or multiplayer online game, for a plurality of client stations, shown as client station 150a to 150c. Online server 110, although shown as a single server, could also comprise multiple servers for load distribution and modularization of server tasks. Server processor 111 accesses server memory 115 to execute online service application 116, which handles network communications between online server 110 and client station 150a to 150c via network 130. Network 130 might comprise a publicly accessible network such as the Internet. Accounts database 120 includes client data 121, which may include registration and security information for authentication, personal information, access history logs, and online avatar or persona state information such as virtual items, character appearance, and attribute statistics. It may be assumed that each user for client station 150a to 150c have already registered an account with accounts database 120, possibly by a web based registration interface or directly through an online client application.

Client station 150a to 150c might each comprise a computing platform such as a personal computer, a video game console, a portable gaming system, a mobile phone, or a mobile Internet device (MID). Client station 150a contains client processor 151a for executing online client application 156a, which interfaces with online service application 116. It might be assumed that as part of the user account registration process, each user has already downloaded and installed online client application 156a to 156c. Alternatively, the online client application might be dynamically downloaded, as for example, a Flash or Java application. In this alternative approach, each client station may access a web server providing a dynamically downloadable online client application.

By interfacing with online service application 116, client processor 151a can receive customized environment 157a, which is then sent to display 160a to be rendered as render 167a. Display 160a can comprise an external or integrated display such as an LCD screen, and render 167a might comprise a two or three dimensional image render of customized environment 157a. The properties of client station 150a as described above could also be applicable to client station 150b, client station 150c, and any other client station connected to online server 110.

Before online server 110 allows a client station to connect, it may first authenticate the client station by accessing accounts database 120 to check user provided credentials against client data 121. For example, a user of client station 150a might be asked for a username and password, which are stored in encrypted form in client data 121. Once the user provides login credentials, server processor 111 may validate those login credentials against client data 121 to authenticate the client station. In this manner, a user can access online service application 116 from any arbitrary client station.

In a traditional shared online environment, client station 150a to 150c may request shared environment 117 for direct rendering on display 160a to 160c, respectively. Thus, assuming that each avatar representation for client station 150a to 150c is positioned within close proximity in shared environment 117, then each client station may have similar virtual viewpoints for shared environment 117. Thus, online client application 156a to 156c may output render 167a to 167c quite similarly. For example, if there happens to be a palm tree shared within the virtual viewpoints of each client station, then that same palm tree may be rendered in render 167a to 167c. Of course, due to performance differences between client processor 151a to 151c and display 160a to 160c, renders 167a to 167c may differ in graphical detail and quality, but they still all depict the same palm tree. No client station attempts to render a different object, such as a cactus, for example.

On the other hand, in the embodiment shown in FIG. 1, each client station is capable of rendering its own particular customized viewpoint. Client station 150a renders customized environment 157a as render 167a, client station 150b renders customized environment 157b as render 167b, and client station 150c renders customized environment 157c as render 167c. The particular modifications made from shared environment 117 to result in a particular customized environment depend on data stored in client data 121, detailed in FIG. 2 below.

Figure 2:
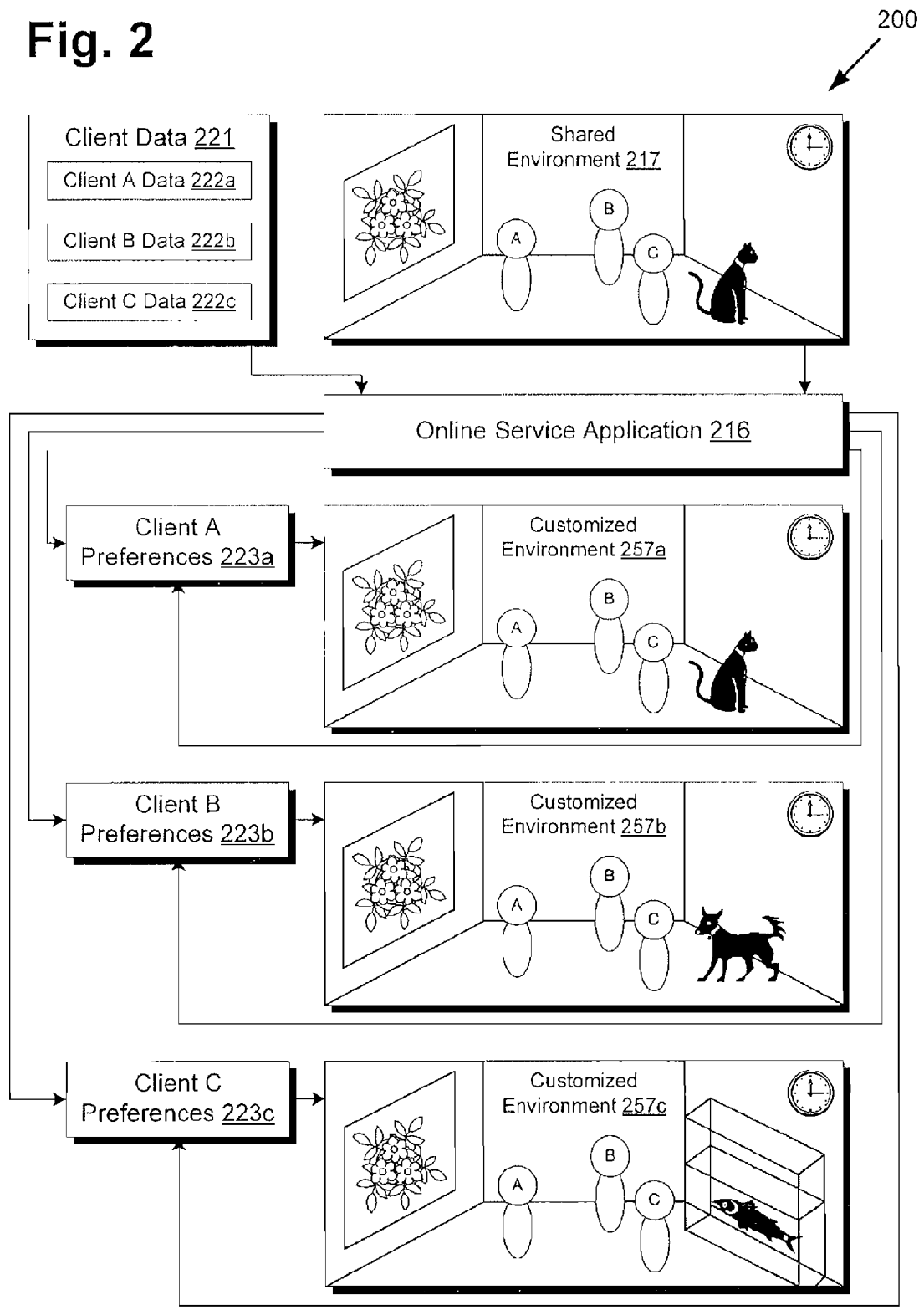
FIG. 2 presents a flowchart showing preference-based substitution of online assets to provide customized experiences in a shared online environment, according to one embodiment of the present invention.

FIG. 2 presents a flowchart showing preference-based substitution of online assets to provide customized experiences in a shared online environment, according to one embodiment of the present invention. Flowchart 200 includes client data 221, shared environment 217, client application 216, client A preferences 223a, client B preferences 223b, client C preferences 223c, customized environment 257a, customized environment 257b, and customized environment 257c. Client data 211 includes client A data 222a, client B data 222b, and client C data 222c.

Client data 221 corresponds to client data 121 from FIG. 1. Shared environment 217 corresponds to shared environment 117. Online service application 216 corresponds to online service application 116. Customized environment 257a to 257c corresponds to customized environment 157a to 157c, respectively. Several components of FIG. 1 have been simplified or eliminated in flowchart 200 for purposes of clarity. Additionally, although each environment in FIG. 2 is shown with a corresponding graphical depiction, the actual data for each environment may simply contain binary data to be passed to a renderer such as online client application 156a, which is interpreted and rendered on display 160a to generate an actual image as render 167a. Thus, the environments shown in FIG. 2 do not necessarily imply that environments are transferred as pre-rendered graphical images.

A display rendering shared environment 217 may look similar to the depiction shown in shared environment 217, having several identifiable objects. Anthropomorphic virtual avatars for each client station are shown, including client A, client B, and client C. All the virtual avatars appear to be situated in a shared room, with a painting on the left wall, a clock on the right wall, and a pet cat on the ground.

As previously discussed, in a traditional shared online environment, each client station might render a scene from an attached display that looks similar to shared environment 217. Thus, every client station renders the same pet cat, the same painting, the same clock, and the same virtual avatars for clients A, B, and C.

On the other hand, with the support of client data 221 and online service application 216 executing on an omitted online server, preferences of each client can be determined, and thus online service application 216 can provide each client station with a customized environment tailored to the preferences of a particular user account associated with a client station.

For example, a survey of favorite pets among registered users might be conducted, with survey results being deposited in appropriate accounts within client data 221. If a user chooses to ignore the survey, other ways of gathering user information indicating preferences may also be used, such as analyzing user account information from an affiliated service, examining e-commerce activity, or tracking past user behavior.

As shown by customized environment 257a, client A might prefer cats as pets, while customized environment 257b might indicate that client B likes dogs as pets, and customized environment 257c may indicate that client C prefers keeping fish in an aquarium. In other words, client A preferences 223a may comprise "likes pet cats," whereas client B preferences 223b may comprise "likes pet dogs," and client C preferences 223c may comprise "likes keeping fish in aquariums." Client A preferences 223a to 223c might be derivable from client A data 222a to 222c, respectively.

For example, client A may have provided a straightforward answer to the above survey, indicating a preference for cats. In this case, it is trivial to determine client A preferences 223a, as it is explicitly stated within client A data 222a. On the other hand, client B may have ignored the survey, or the survey may have ended up caught in a junk mail filter, never to be read.

Thus, to determine client B preferences 223b, other data points stored in client B data 222b might be utilized by online service application 216. For example, perhaps online service application 216 allows each client to have their own room to customize and decorate, as well as visiting rooms of other clients to interact with the furniture and items stored in their rooms. Additionally, perhaps each user is given the option of having a particular pet, and users can interact with the pet by playing with it or petting it. These actions might be stored in an activity log within an associated user account. Thus, for example, client B data 222b might indicate that client B tends to interact with dog pets versus cat pets or other types of pets, from which a preference for dog pets might be deduced as client B preferences 223b.

Client C might have ignored the survey as well, so client C preferences 223c needs to be deduced as well. For example, if client C purchased fish food from an affiliated pet goods e-commerce website, it might be deduced that client C keeps pet fish at home and thereby probably prefers fish over other pets. Another example might extrapolate deductions from data concerning a particular group or demographic client C may be belong to. This data might exist from existing data sets in client data 221, or be retrieved from external sources.

For example, through data mining, it might be observed that for whatever reason, males aged 40 through 50 who live on the east coast tend to prefer keeping fish to other pets. Thus, these relationship factors might be weighted against any personal information available about client C in client C data 222c to determine client C's affinity towards keeping fish. Assuming some personal details were voluntarily provided as part of the registration process, client C may have indicated gender as male, age as 45, and residence in Rhode Island, all factors indicating membership within the "40-50s male east coaster fish preference" relationship. Whether that relationship is actually reliable may be another question, but online service application 216 may also assign a probability weighting for particular relationships indicating confidence in relationship accuracy. Perhaps, for some reason, this relationship has been proven by many independent data points, and is thus deemed highly reliable. If this is the case, online service application 216 might conclude fairly conclusively that client C preferences 223c should indicate a bias for keeping fish in aquariums.

If, on the other hand, absolutely no data pointing to a preference either way can be derived, a default might be assumed, or the customization step may be bypassed. For example, if client A data 222a is a blank slate with only minimal information required to register an account, there may not be enough data to make any preference determinations. In that case, a default of "prefer cats as pets" might be assumed, or shared environment 217 might be provided directly for rendering, skipping customization.

Once each client's preferences are derived, they may be used by online service application 216 to modify shared environment 217 for each client station. Thus, the pet of shared environment 217 is changed to match an estimated user preference at each client station. The level of customization provided might be user adjustable, or specified by server administrators. In an environment with high levels of customization, each customized environment may look completely different from a corresponding shared environment. On the other hand, in an environment using low levels or subtle usage of customization, only a few elements might be modified among customized environments.

In FIG. 2, it can be observed that only the type of pet is changed between customized environments, whereas the virtual avatars, the painting, and the clock remain static. Alternative embodiments may customize shared environment 217 drastically by changing several elements, just a few, or something in-between. For example, each painting might be matched with client art sensibilities; the clock may be changed to a digital clock or analog clock depending on the client's age generation; virtual avatars might dress or appear differently depending on client fashion sense. Thus, although each client is participating in a shared space represented by shared environment 217, each client also has their own preference-based personalized custom view of shared environment 217, represented by customized environment 257a to 257c.

FIG. 3 presents a block diagram of a network environment supporting filtering of client interactions to maintain a perception of a shared environment among client stations, according to one embodiment of the present invention. Network environment 300 includes online server 310, network 330, client station 350a, client station 350b, and client station 350c. Online server 310 includes shared environment 317, interaction data filter 318, and online service application 316. Client station 350a includes customized environment 357a, which includes interaction 358a. Client station 350b includes client processor 351b, online client application 356b, customized environment 357b, and interaction data 359b. Customized environment 357b includes interaction 358b.

One problem with providing drastic or even subtly differing environments for different clients is the issue of nevertheless maintaining a perception of a shared environment. In a traditional shared online environment, this is generally not an issue as each client shares largely the same exact view of the shared environment. On the other hand, by starting with a shared environment but customizing views for individual client stations, there is the risk of having client stations interacting in a manner that is incoherent or jarring to other client stations with differing customized environments.

While this problem may be partially avoided by restricting interaction to pre-selected and approved phrases and actions, this severely limits the freedom of users. For some users, the ability to speak and act freely may comprise the sine qua non of the online experience, particularly in a shared social context. Thus, restricting users to select only canned phrases or actions may not provide enough freedom to engage in meaningful social relations.

One alternative method for maintaining the perception of a shared environment may include applying a filter for user actions and appropriately changing the user actions depending on whether the user actions are specific to a customized environment. In other words, user actions that are consistent with the view of the shared environment among all connected client stations can be passed as usual, but other user actions specific to a particular customized environment may need to be examined and filtered accordingly.

For example, interaction 358b comprises a user, client B of client station 350b, engaging in a chat function of online client application 356b to broadcast a public message to all other users within shared environment 317, including client A of client station 350a and client C of client station 350c. As shown in FIG. 3, client B or user B broadcasts the public message, "Isn't that a cute dog! What kind of flower is in that painting?" If this message was broadcasted unmodified to client station 350a and client station 350c, the first half regarding the dog would make no sense since as far as client A is concerned, there is only a cat in customized environment 357a, and as far as client C is concerned, there is only a fish in customized environment 357c.

However, since all client stations observe a shared view of the flower painting, the second half of the broadcasted message concerning the flower still makes sense. Similarly, if client B made a statement about the wall clock to the right, there would be little risk of broadcasting an incoherent or jarring message, as all client stations see the same wall clock. Elements from shared environment 317 that are not customized for client stations can be handled as usual in the traditional shared environment model. This is not to imply that filtering is not used at all, as obscenity filters or other forms of general moderation may still apply for all clients. However, as far as filtering for maintaining an impression of a shared environment, elements that remain static from shared environment 317 might be safely ignored.

Thus, the statement regarding the pet may need to be modified in some manner before being broadcasted to client station 350a and client station 350c. One possible solution is to implement a translation filter for interaction data filter 318, where actions specific to one client station are translated to appropriate actions for other client stations. Thus, when online server 310 retrieves interaction data 359b from client station 350b, online service application 316 can compare interaction data 359b against customized environment 357a and customized environment 357c to generate appropriate translated interaction data for client station 350a and client station 350c. Thus, online service application 316 can generate interaction 358a for client station 350a, where "dog" is replaced with "cat," and interaction 358c for client station 350c, where "dog" is replaced with "fish," thus conforming to client expectations of a consistent shared environment.

Besides text or speech filtering, action filtering could also be implemented by interaction data filter 318. For example, instead of commenting about the dog, perhaps user B decides to pet the dog. This interaction could be translated into petting the cat for client station 350a, or making fish faces for the fish in client station 350c. Another example might involve feeding the pet. Whereas user B might see his virtual avatar giving the dog a bone, that same action might be represented as user B giving the cat a bowl of milk in customized environment 357a, or as user B dropping fish food in the aquarium of customized environment 357c.

In addition to translating actions to suit particular customized environments for different client stations, interaction data filter 318 could also make such actions generally applicable for shared environment 317. In other words, rather than making actions specific for each environment, actions are made general to suit any environment. For example, interaction 358b could be modified so that user B simply says, "Isn't that a cute pet!" Since the word "pet" is generally applicable for shared environment 317 even after customization for different client systems, there is no incompatibility with sending this generalized message for all client stations.

Ignoring or deleting interactions completely is another option, although such an extreme measure might be reserved only as a fallback for unexpected interactions. For example, the entire first sentence of interaction 358b relating to the dog could be stricken, leaving only the statement regarding the painting intact. Thus, as far as client station 350a and client station 350c are concerned, user B made no comment about the pet at all. Although this method might still elicit some awkwardness if user B is expecting a response regarding the dog, it may still outweigh the awkwardness of having user A and user C receive a message incompatible with their respectively customized environments.

FIG. 4 shows a flowchart describing the steps, according to one embodiment of the present invention, by which a server processor of an online server can provide customized experiences for client stations in a shared online environment. Certain details and features have been left out of flowchart 400 that are apparent to a person of ordinary skill in the art. For example, a step may comprise one or more substeps or may involve specialized equipment or materials, as known in the art. While steps 410 through 440 indicated in flowchart 400 are sufficient to describe one embodiment of the present invention, other embodiments of the invention may utilize steps different from those shown in flowchart 400.

Referring to step 410 of flowchart 400 in FIG. 4 and network environment 100 of FIG. 1, step 410 of flowchart 400 comprises server processor 111 of online server 110 retrieving client data 121 from accounts database 120 relating to a client of client station 150a, referred to as user A or client A. Server processor 111 may be executing online service application 116, which in turn requests client data from accounts database 120 concerning all client stations connected by a publicly accessible network 130, including client station 150a to 150c. Accounts database 120 may actually be hosted as part of online server 110, or may be hosted elsewhere on a dedicated database server or a distributed cluster of database servers. Similarly, online server 110 may actually comprise multiple servers for providing distributed computational resources for online service application 116. After online server 110 retrieves client data 121, it may store data in server memory 115 indicating, as previously discussed, that client A answered a pet preference questionnaire indicating a preference for cats.

Referring to step 420 of flowchart 400 in FIG. 4 and flowchart 200 of FIG. 2, step 420 of flowchart 400 comprises a server processor of an online server executing online service application 216 determining client A preferences 223a based on the client data retrieved from step 410. If client data 221 corresponds to client data 121 from FIG. 1, then client A data 222a may indicate that client A answered a pet preference questionnaire indicating a preference for cats. Client A data 222a may already be stored in a memory accessible to online service application 216 as a result of step 410. Thus, client A preferences 223a can be determined straightforwardly as the preferences of client A are specified explicitly from the questionnaire. In less clear situations, as previously discussed, online service application 216 may have to process implicit data contained in client A data 222a, including behavioral tracking and marketing information from affiliated partners, to determine a best guess as to what client A preferences 223a should be. If no implicit data is available, then a default preference or some other fallback mechanism may be substituted.

Referring to step 430 of flowchart 400 in FIG. 4 and network environment 300 of FIG. 3, step 430 of flowchart 400 comprises a server processor of online server 310 executing online service application 316 creating customized environment 357a from shared environment 317 according to the user preferences determined in step 420. Since step 420 indicates that client A prefers cats, customized environment 257a is created such that whatever pet existing in shared environment 217 is customized in favor of cats. Since shared environment 217 already contains a cat by default, step 430 does not actually modify shared environment 217 in this case, but if shared environment 217 contained no default pet or a different default pet, then the pet would be replaced with a cat to align with the preferences determined from step 420.

Referring to step 440 of flowchart 400 in FIG. 4 and network environment 100 of FIG. 1, step 440 of flowchart 400 comprises server processor 111 of online server 110 sending customized environment 157a to online client application 156a executing on client processor 151a of client station 150a. As shown in FIG. 1, step 440 has already been accomplished, as client station 150a already has access to customized environment 157a. This can be accomplished by using the connection between online service application 116 and online client application 156a via network 130 as a data pipe for transfer of customized environment 157a. Online client application 156a can then interpret customized environment 157a to generate render 167a, which is sent to display 160a, thereby providing a customized experience for client A. Steps 410 to 440 could also be applicable for client B and client C, or client station 150b and client station 150c, respectively.

However, one problem after providing customized environments resulting from step 440 may involve gracefully interpreting client interactions with different customized environments such that the perception of a shared online environment is nevertheless maintained. As previously discussed, some techniques might include translating actions for each client station, making actions generically applicable to the shared environment accessible to all client stations, or simply deleting or ignoring actions that may suspend disbelief in a shared online environment. These techniques may be implemented as part of interaction data filter 318 of FIG. 3, which is accessible from online service 316 executing on a server processor of online server 310. If interaction data filter 318 provides accurate and seamless filtering for online service application 316, then clients can transparently enjoy the benefits of personalized customization while addressing the human need for communication and companionship via social networks provided by a shared online environment.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A system for providing customized experiences to a plurality of client stations in a shared social environment, the system comprising:
a first online client application for execution by a first client processor of a first client station of the plurality of client stations and for rendering the shared social environment on a first client display of the first client station for a first client;
a second online client application for execution by a second client processor of a second client station of the plurality of client stations and for rendering the shared social environment on a second client display of the second client station for a second client in social interaction with the first client;
an accounts database having data relating to a plurality of clients including the first client and the second client; and
an online server hosting the shared social environment for social interactions between the plurality of clients, and the online server having a server processor configured to:
retrieve client data from the accounts database relating to the first client and the second client;
determine first client preferences of the first client and second client preferences of the second client based on the client data;
create a first customized social environment from the shared social environment according to the first client preferences and a second customized social environment from the shared social environment according to the second client preferences;
send the first customized social environment to the first online client application being executed on the first client station of the first client for rendering on the first client display and the second customized social environment to the second online client application being executed on the second client station of the second client for rendering on the second client display;
receive shared interaction data from a third client of the plurality of clients for an interaction with the first client and the second client in the shared social environment, wherein the shared interaction data is a message relating to a customizable element in the shared social environment, the customizable element being a first customizable element in the first customized social environment and the customizable element being a second customizable element in the second customized social environment, the first customizable element being different than the second customizable element;
apply a first interaction data filter corresponding to the first customized social environment to the message for generating a first message including a first reference to the first customizable element to be displayed to the first client in the first customized environment; and
apply a second interaction data filter corresponding to the second customized social environment to the message for generating a second message including a second reference to the second customizable element to be displayed to the second client in the second customized environment;
wherein the first message displayed in the first customized environment is different than the second message displayed in the second customized environment.

2. The system of claim 1, wherein the server processor is configured to create the first customized social environment by substituting one or more of custom audio and visual assets in the shared social environment.

3. An online server for providing customized experiences to a plurality of client stations in a shared social environment, the plurality of client stations including a first client station having a first online client application for execution by a first client processor for rendering the shared social environment on a first client display for a first client and including a second client station having a second online client application for execution by a second client processor for rendering the shared social environment on a second client display for a second client in social interaction with the first client, the online server comprising:
  an accounts database having data relating to a plurality of clients including the first client and the second client; and
  a server processor configured to:
    retrieve client data from the accounts database relating to the first client and the second client;
    determine first client preferences of the first client and second client preferences of the second client based on the client data;
    create a first customized social environment from the shared social environment according to the first client preferences and a second customized social environment from the shared social environment according to the second client preferences;
    send the first customized social environment to the first online client application being executed on the first client station of the first client for rendering on the first client display and the second customized social environment to the second online client application being executed on the second client station of the second client for rendering on the second client display;
    receive shared interaction data from a third client of the plurality of clients for an interaction with the first client and the second client in the shared social environment, wherein the shared interaction data is a message relating to a customizable element in the shared social environment, the customizable element being a first customizable element in the first customized social environment and the customizable element being a second customizable element in the second customized social environment, the first customizable element being different than the second customizable element;
    apply a first interaction data filter corresponding to the first customized social environment to the message for generating a first message including a first reference to the first customizable element to be displayed to the first client in the first customized environment; and
    apply a second interaction data filter corresponding to the second customized social environment to the message for generating a second message including a second reference to the second customizable element to be displayed to the second client in the second customized environment;
    wherein the first message displayed in the first customized environment is different than the second message displayed in the second customized environment.

4. The online server of claim 3, wherein the server processor is configured to create the first customized social environment by substituting one or more of custom audio and visual assets in the shared social environment.

5. A method for use by an online server for providing customized experiences to a plurality of client stations in a shared social environment, the plurality of client stations including a first client station having a first online client application for execution by a first client processor for rendering the shared social environment on a first client display for a first client and including a second client station having a second online client application for execution by a second client processor for rendering the shared social environment on a second client display for a second client in social interaction with the first client, the online server including an accounts database having data relating to a plurality of clients including the first client and the second client, the method comprising:
  retrieving client data from the accounts database relating to the first client and the second client;
  determining first client preferences of the first client and second client preferences of the second client based on the client data;
  creating a first customized social environment from the shared social environment according to the first client preferences and a second customized social environment from the shared social environment according to the second client preferences;
  sending the first customized social environment to the first online client application being executed on the first client station of the first client for rendering on the first client display and the second customized social environment to the second online client application being executed on the second client station of the second client for rendering on the second client display;
  receiving shared interaction data from a third client of the plurality of clients for an interaction with the first client and the second client in the shared social environment, wherein the shared interaction data is a message relating to a customizable element in the shared social environment, the customizable element being a first customizable element in the first customized social environment and the customizable element being a second customizable element in the second customized social environment, the first customizable element being different than the second customizable element;
  applying a first interaction data filter corresponding to the first customized social environment to the message for generating a first message including a first reference to the first customizable element to be displayed to the first client in the first customized environment; and
  applying a second interaction data filter corresponding to the second customized social environment to the message for generating a second message including a second reference to the second customizable element to be displayed to the second client in the second customized environment;
  wherein the first message displayed in the first customized environment is different than the second message displayed in the second customized environment.

6. The method of claim 5, wherein the first customized social environment is created by substituting one or more of custom audio and visual assets in the shared social environment.

* * * * *